(12) United States Patent
Shi et al.

(10) Patent No.: US 7,821,727 B2
(45) Date of Patent: Oct. 26, 2010

(54) LENS DRIVING DEVICE

(75) Inventors: Bin Shi, Hong Kong (CN); Hong Li, Shenzhen (CN); Xingquan Li, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 83 days.

(21) Appl. No.: 12/362,803

(22) Filed: Jan. 30, 2009

(65) Prior Publication Data

US 2009/0190242 A1    Jul. 30, 2009

(30) Foreign Application Priority Data

Jan. 30, 2008    (CN) .......................... 2008 1 0065308

(51) Int. Cl.
*G02B 7/02*    (2006.01)
*G02B 15/14*   (2006.01)

(52) U.S. Cl. ........................ 359/824; 359/814; 359/698; 720/683; 310/12.24; 396/55

(58) Field of Classification Search ................. 359/814, 359/823, 824, 698; 310/12, 12.04, 12.16, 310/12.22, 12.32; 369/44.22, 115, 147; 396/330, 396/468, 483; 720/672, 683; 235/454, 462.2
See application file for complete search history.

(56) References Cited

U.S. PATENT DOCUMENTS

| | | | |
|---|---|---|---|
| 5,587,846 A * | 12/1996 | Miyano et al. .............. 359/824 |
| 5,644,440 A * | 7/1997 | Akada .......................... 359/823 |
| 5,745,800 A * | 4/1998 | Kanbara et al. ............... 396/55 |
| 5,812,330 A * | 9/1998 | Akada .......................... 359/823 |
| 5,859,733 A * | 1/1999 | Miyano et al. .............. 359/824 |
| 6,628,601 B1 * | 9/2003 | Kobayashi ................... 720/683 |
| 7,652,712 B2 * | 1/2010 | Watanabe et al. ........... 348/340 |
| 2008/0055027 A1 * | 3/2008 | Kayama et al. ............. 335/222 |

* cited by examiner

*Primary Examiner*—Loha Ben
(74) *Attorney, Agent, or Firm*—Muncy, Geissler, Olds & Lowe, PLLC

(57) ABSTRACT

A lens driving device, comprises a base; a casing fixed to the base; a coil bracket disposed within the casing; a coil wound on the coil bracket, a spring disposed within the casing, a drive rod; and a lens holder; wherein, one end of the spring is fixed to the base; one end of the drive rod is fixed to the other end of the spring, and the other end of the drive rod extends out of the casing. The lens holder is slidably fixed to the exposed portion of the drive rod. The lens holder is held stationary with respect to the drive rod by static friction between the drive rod and the lens holder. A driving signal may be applied to the coil to move the lens holder. The driving signal has the characteristic of making the current flowing through the coil slowly increase and then rapidly decrease, or to rapidly increase and then slowly decrease. The drive current is preferably a sawtooth pulse train, with each pulse causing movement of the lens holder in the micron range or below.

7 Claims, 2 Drawing Sheets

LENS DRIVING DEVICE

CROSS REFERENCE TO RELATED APPLICATIONS

This non-provisional patent application claims priority under 35 U.S.C. §119(a) from Patent Application No. 200810065308.9 filed in The People's Republic of China on Jan. 30, 2008.

FIELD OF THE INVENTION

The present invention relates to field of cameras for mobile phones, and in particular, to a lens driving device.

BACKGROUND OF THE INVENTION

With mobile phones being popular and their function being diversified, mobile phones with an automatic focusing camera will better market prospects. Existing mobile phones with automatic focusing cameras usually use electromagnetic induction motors, which have advantages of high rotating speed and high efficiency, but also have disadvantages of poor positioning accuracy, being incapable of fast self-lock, difficult to miniaturize further, so they are not suitable for the trend of making the cameras of mobile phone smaller.

Voice coil motors can support lens to move smoothly and continuously over a small distance. With advantages of small volume and simple structure, the VCM has become widely used in lens modules of mobile phone. However, in a voice coil motor, the lens holder depends on a spring for support, and to keep its position, a continuous electric current is required to obtain an electromagnetic force balancing the force of the spring to keep the position of the lens during shooting of a photo. As the elastic strength of the spring is low, it will vibrate near the target position during positioning, so it is not a good solution for fast positioning required by modern automatic focusing camera systems.

SUMMARY OF THE INVENTION

Hence there is a desire for a lens driving device which overcomes the above disadvantages or at least gives the public a useful choice.

Accordingly, in one aspect thereof, the present invention provides a lens driving device comprising: a base; a casing fixed to the base; a coil bracket disposed in the casing; a coil wound on the coil bracket; a spring disposed in the casing; a drive rod made of magnetic material, and a lens holder, wherein a first end of the spring is fixed to the base; a second end of the spring is fixed to a first end of the drive rod, a second end of the drive rod extends out of the casing; the lens holder is slidably fixed to the drive rod external of the casing, and the lens holder is moved with the drive rod by static friction between the drive rod and the lens holder.

Preferably, an elastic clip is provided on one side of the lens and the elastic clip slidably fixes the lens holder to the drive rod, the drive rod passing through a hole in the elastic clip.

Preferably, the hole in the elastic clip is a split ring which has a natural diameter less than the diameter of the drive rod.

Preferably, the end of the casing remote from the base has a locating hole through which the drive rod passes and an antifriction ring fixed in the locating hole slidably receives the drive rod.

Preferably, the second end of the spring and the first end of the drive rod are disposed within the coil bracket.

Preferably, a driving signal is applied to the coil; the driving signal making current flowing through the coil slowly increase and then rapidly decrease, or to rapidly increase and then slowly decrease.

Preferably, the driving signal is a saw tooth pulse sequence, each pulse moving the lens holder in or below micron range.

BRIEF DESCRIPTION OF THE DRAWINGS

A preferred embodiment of the invention will now be described, by way of example only, with reference to figures of the accompanying drawings, in which.

Figure 1:
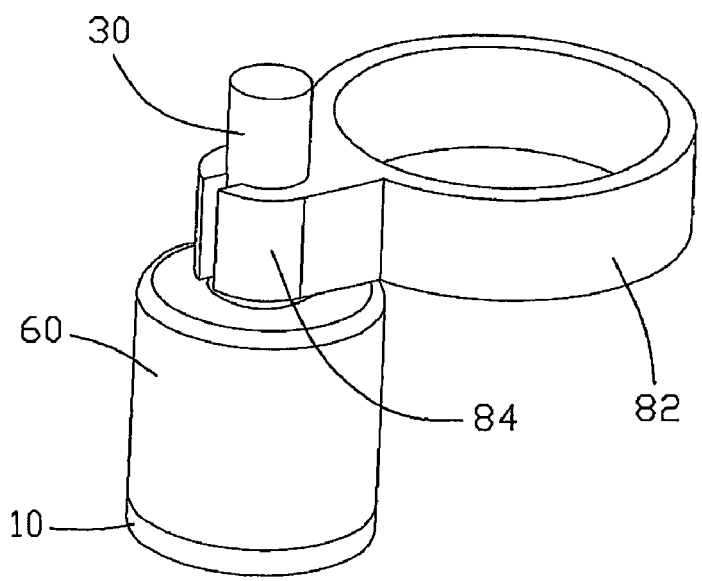
FIG. 1 is an isometric view of a lens driving device according to the preferred embodiment of the present invention.

In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale.

DESCRIPTION OF THE PREFERRED EMBODIMENT

Figure 2:
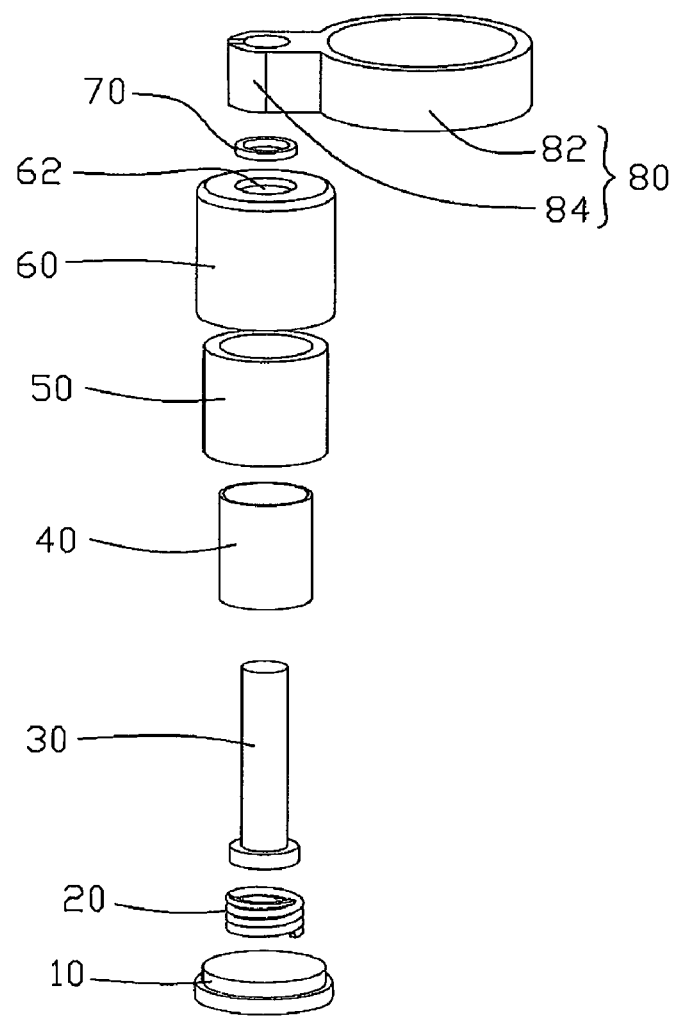
FIG. 2 is an exploded view of the lens driving of FIG. 1.
Figure 3:
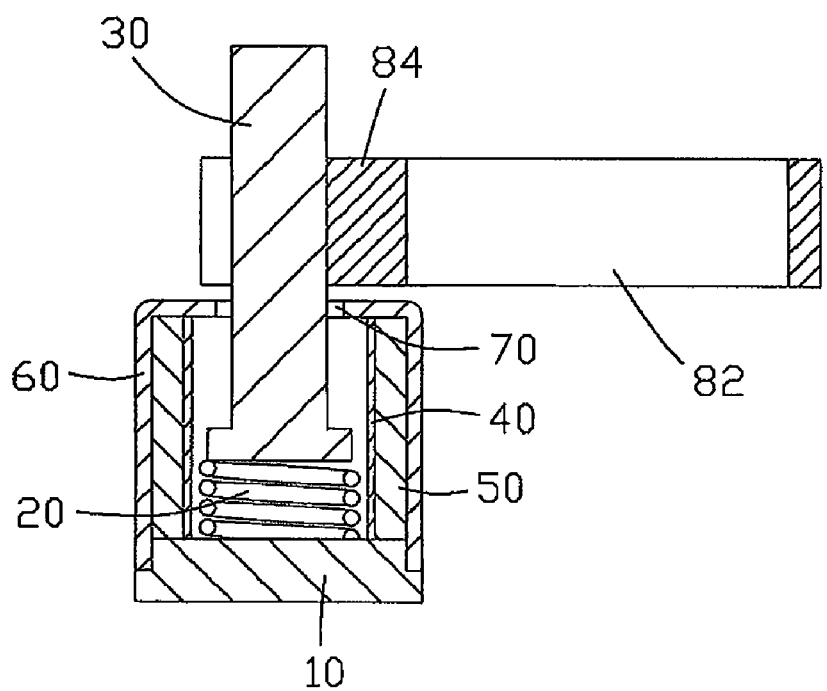
FIG. 3 is a sectional view of the lens driving device of FIG. 1.

As shown in FIG. 1 to FIG. 3, the lens driving device of the preferred embodiment comprises a base 10, a spring 20, a drive rod 30, a coil bracket 40, a coil 50, a casing 60, an antifriction ring 70 and a lens holder 80.

The casing 60 is fixed to the base 10, and the end of the casing 60 opposite the base 10 is provided with a locating hole 62. The coil bracket 40 is disposed in the casing 60 and fixed to the base 10. The coil 50 is wound on the outside of the coil bracket 40 and disposed within the casing 60. The spring 20 is located within the coil bracket 40, with one end fixed to the base 10. One end of the drive rod 30 is disposed within the coil bracket 40 and fixed to the other end of the spring 20. The drive rod 30 passes through the locating hole 62 of the casing 60 so that the other end of the drive rod is located externally of the casing 60.

The antifriction ring 70 is fitted to the locating hole 62 of the casing 60 and slidably supports movement of the drive rod 30 through the casing. Thus the antifriction ring provides a low friction bearing interface between the drive rod and the casing.

The lens holder 80 comprises a main part 82 containing the lens (not shown) and an elastic clip 84 provided on the outside of the main part 82. The elastic clip 84 is slidably fixed to the exposed portion of the drive rod 30. The elastic clip 84 comprises a split ring which fits over the drive rod. The split ring has a relaxed or natural diameter slightly less than the diameter of the drive rod so that when fitted to the drive rod, the ring is resiliently sprung to provide a frictional sliding connection between the drive rod 30 and the lens holder 80. The degree of static friction between the drive rod and the elastic clip can be predetermined by material choice, dimensions of the split ring and the degree of deformation of the split ring from its relaxed state.

Figure 4:
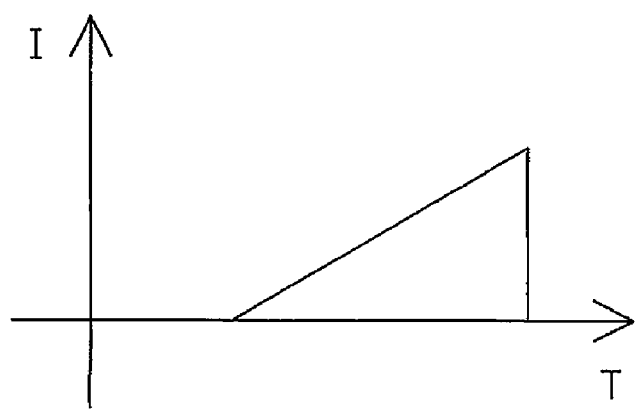
FIG. 4 is a Time v Current diagram of a driving signal for the lens driving device.

A driving signal, as shown in FIG. 4, is passed through the coil 50. Before the driving signal acts on the coil 50, the forces within the system are balanced and the system is in a state of relative rest. When the current through the coil 50 slowly increases, the electromagnetic force produced by the coil 50 also slowly increases, so the drive rod 30, being of a ferromagnetic material, slowly moves forward (towards the base) by the action of electromagnetic force and at this time the spring 20 will be slowly deformed. The static friction between the elastic clip 84 and the drive rod 30 causes the lens holder 80 to slowly move forward together with the drive rod 30, and at this time there is no relative movement between the lens holder 80 and the drive rod 30. When the current through the coil 50 is suddenly cut off or the current intensity of the coil 50 is rapidly decreased, the spring 20 quickly recovers from the deformed state, and at this moment, the drive rod 30 moves backward at great speed. By the action of inertia, the lens holder 80 will keep moving forward in the original moving direction or keep near the position it was when the current was cut overcoming the static friction. At this moment the friction between the elastic clip 84 and the drive rod 30 is sliding friction, and the lens holder 80 moves forward relative to the drive rod 30. So, with the action of a drive pulse, the lens holder 80 moves forward for a short distance in the micron range, and with the continuous action of a drive signal pulse sequence, the lens holder 80 can implement continuous one-way movement. When the lens holder 80 gets to the desired position, the drive signal to the coil 50 is cut off, and the lens holder 80 is positioned at the desired position by the action of static friction between the elastic clip 84 and the drive rod 30, so that the lens fixed to the lens holder 80 is ready for a photo to be taken.

It is to be understood that, by changing the form of the driving signal, changing the driving signal from slowly increasing and suddenly decreasing to a driving signal which suddenly increases and slowly decreases, the lens holder 80 can be moved in the opposite direction. The preferred drive signal is a triangular pulse signal of the saw tooth form having one side with a long slope and the other side with a short steep slope or step.

In use, preferably, the current through the coil is zero to conserve energy. When the lens is required to be moved, the drive signal is applied to the coil 50 to move the lens to the desired location and then the current is again reduced to zero with the lens being held in the desired position by the static friction between the lens holder 80 and the drive rod 30. To move the lens holder, the drive signal either slowly increases the current through the coil 50 to move the drive rod 30 and lens holder 80 and then rapidly decreases to move the drive rod 30 sharply, breaking or overcoming the static friction between the drive rod 30 and the lens holder 80 causing relative movement between the lens holder 80 and the drive rod 30. To move the lens holder in the opposite direction, the current in the coil is rapidly increased to sharply move the drive rod 30 such that the rapid movement of the drive rod 30 and the inertia of the lens holder 80 overcomes the static friction between the drive rod 30 and the lens holder 80 and the drive rod moves through the hole in the elastic clip 84. Then, when the current is slowly decreased, the drive rod 30 moves slowly in the opposite direction without breaking the static friction between the drive rod 30 and the lens holder 80 and thus moves the lens to a new position as the drive rod 30 returns to its rest position.

It is to be understood that, the driving signal is may not be purely triangular, and the driving signal will be effective if the driving signal can make the coil current slowly increase and then rapidly decrease, or to rapidly increase and then slowly decrease.

In the preferred embodiment of the present invention, by being excited by a triangular or sawtooth pulse, the displacement step size of the lens holder 80 may be at or below micron range, so as to give the lens holder 80 a very high positioning accuracy. The lens holder 80 and the drive rod 30 at rest are held stationary with respect to each other through static friction between the drive rod and the elastic clip. Thus, the energy consumption can be reduced. The components used in certain embodiments of the present invention are common and cheap, keeping the costs of the lens driver low.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. A lens driving device comprising: a base; a casing fixed to the base; a coil bracket disposed in the casing; a coil wound on the coil bracket; a spring disposed in the casing; a drive rod made of magnetic material, and a lens holder, wherein a first end of the spring is fixed to the base; a second end of the spring is fixed to a first end of the drive rod, a second end of the drive rod extends out of the casing, the lens holder is slidably fixed to the drive rod external of the casing, and the lens holder is moved with the drive rod by static friction between the drive rod and the lens holder.

2. The lens driving device of claim 1, wherein an elastic clip is provided on one side of a main part of the lens holder and the elastic clip slidably fixes the lens holder to the drive rod, the drive rod passing through a hole in the elastic clip.

3. The lens driving device of claim 2, wherein the hole in the elastic clip is a split ring which has a natural diameter less than the diameter of the drive rod.

4. The lens driving device of claim 1, wherein the end of the casing remote from the base has a locating hole through which the drive rod passes and an antifriction ring fixed in the locating hole slidably receives the drive rod.

5. The lens driving device of claim 1, wherein the second end of the spring and the first end of the drive rod are disposed within the coil bracket.

6. The lens driving device of claim 1, wherein a driving signal is applied to the coil; the driving signal making current flowing through the coil slowly increase and then rapidly decrease, or to rapidly increase and then slowly decrease.

7. The lens driving device of claim 6, wherein the driving signal is a sawtooth pulse sequence, each pulse moving the lens holder in or below micron range.

* * * * *